Dec. 26, 1933.  L. THIRY  1,941,061
ELASTIC SHAFT COUPLING
Filed July 17, 1928
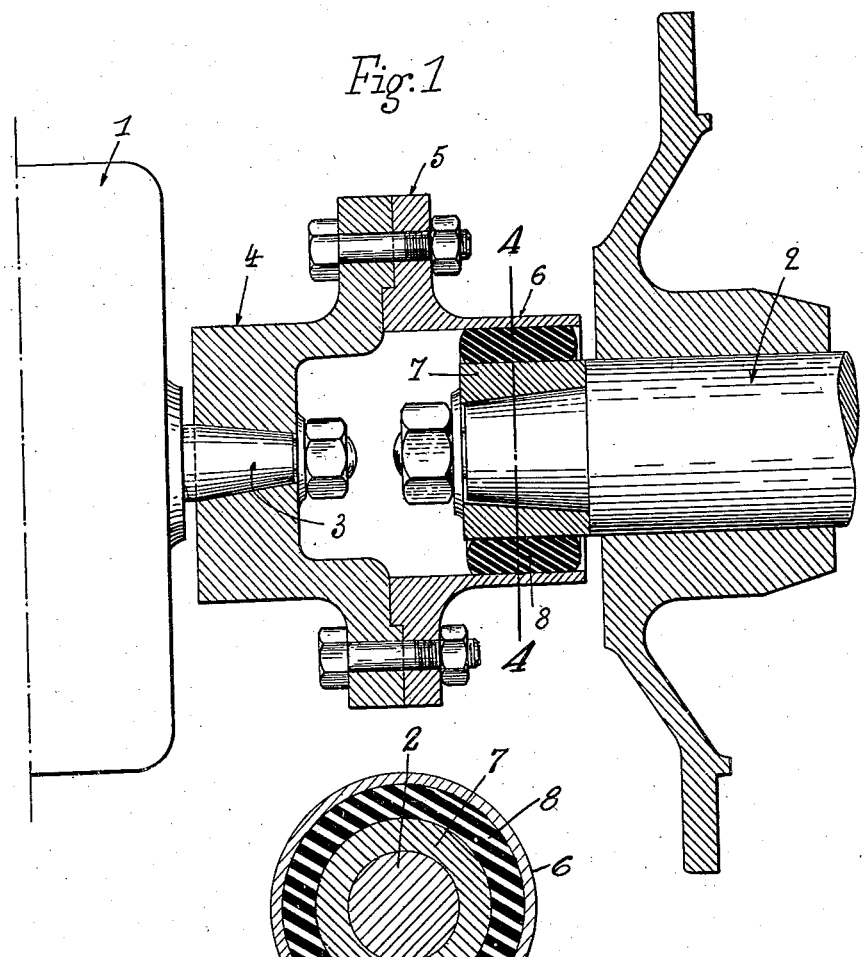
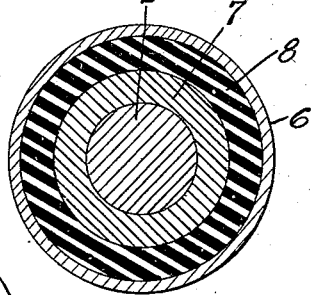
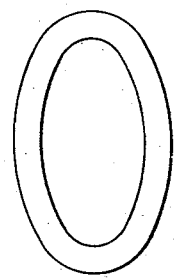
Fig.4.
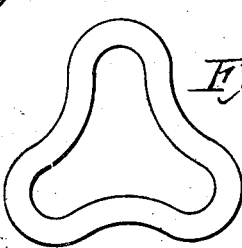
Fig.3.
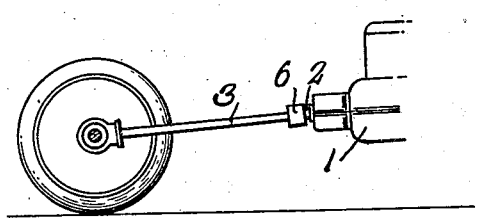
Léon Thiry
INVENTOR
By Otto Munk
his ATTY.

Patented Dec. 26, 1933

1,941,061

UNITED STATES PATENT OFFICE 1,941,061

ELASTIC SHAFT COUPLING

Leon Thiry, Huy, Belgium

Application July 17, 1928, Serial No. 293,374, and in France September 9, 1927

7 Claims. (Cl. 64—96)

The present invention relates to elastic shaft couplings which are used for connecting two shafts or other machine parts and transmitting power from one another. The elastic couplings of this class are adapted to transmit the driving torque while at the same time absorbing the shocks, jarring and sudden variations of the driving torque, and also operating to some extent as a Cardan joint when the axes of rotation of the two elements to be coupled are not exactly in alignment.

The invention has for its object an elastic shaft coupling of a very simple and substantial construction, and by which the above-mentioned condition will be properly fulfilled. The said coupling is essentially characterized in that it comprises a hollow member secured to one of the rotating members, and a ring consisting of india rubber or like plastic substance which is interposed between the said hollow member and the other rotating member, said ring being considerably stretched in the direction of the axis in such manner as to exert a strong pressure upon the metallic surfaces which are in contact therewith and thus to produce the adhesion required to transmit the driving torque.

A coupling of this construction offers particular advantages for connecting the starter and differential gear with the engine of a motor vehicle.

In the appended drawing:

Fig. 1 is a vertical section of an elastic coupling according to the invention.

Figs. 2 and 3 are end views of the two forms of the india rubber ring.

Fig. 4 is a sectional view taken on the line 4—4 of Figure 1; and

Fig. 5 is a side elevational view of the coupling used to connect an engine with the rear differential gearing of a motor vehicle.

Referring to the drawing, 1 is an electric motor which serves to start a vehicle engine, and whose shaft 3 is to be coupled to the crankshaft 2 of the engine by an elastic coupling. The elastic coupling according to the invention comprises a disc 4 which is keyed to the shaft 3 and to which is bolted the flange 5 of a socket 6 having a cylindrical configuration. Between the said socket 6 and a second cylindrical member 7, keyed to the crankshaft 2, is interposed a ring 8 of india rubber or like plastic substance, which is considerably stretched or elongated in the direction of the axis, or otherwise stated, the thickness of said ring in the free state is much greater than the radial space between the socket 6 and member 7. As is seen in Figure 4 the surfaces of the members 6 and 7 which contact the ring 8 are circular in cross section. Due to the great deformation of the ring 8, it will strongly adhere to the socket 6 and member 7, and the adhesion is so calculated that it will be sufficient to transmit the desired driving torque.

Due to the plastic nature of the india rubber, the shafts may be coupled even if for any reason, such as faulty assembling, wear or the like, the axes of shafts 3 and 2 are not perfectly in line, the coupling acting as a Cardan joint. On the other hand, in the case of sudden variations in the driving torque, and chiefly when starting, the india rubber ring 8 forms a shock absorber, and this property makes it particularly advantageous when used to connect a starter to the engine of a motor vehicle.

In the case of a still more violent shock (due to an exceedingly rapid variation of the driving torque) the india rubber ring 8 may temporarily slide with reference to the metallic members, whereby the shock will not be transmitted to the engine or other driven mechanism.

Should the adhesion due to compression be insufficient to transmit the driving torque, I may employ metallic members which are fluted, striated or otherwise shaped. For the said members I may substitute other suitable members having an oval cross section (Fig. 2), a triangular section, or a clover leaf section (Fig. 3) or the like.

If the coupling serves to connect the starter with the engine of a motor vehicle, the said coupling may obviously be mounted between the starter and the end of the crankshaft, or between the starter and a pinion engaging a toothed ring mounted on the flywheel of the engine. This coupling may also be used for connecting the engine with the differential gearing of the rear wheels, as shown in Figure 5.

Having now described my invention, what I claim as new and desire to secure by Letters Patent is:

1. An elastic shaft coupling comprising a hollow member secured to one of the shafts to be coupled, an inner member secured to the other shaft and a ring of elastic material inserted between said members and considerably elongated in the axial direction, due to being compressed in a radial direction to thereby lengthen the same and produce the necessary adhesion, the cross-section of these members and ring being circular.

2. A shaft coupling comprising a driving member and a driven member of substantially circular cross section arranged in telescoping relation about the axes of the driving and driven shafts with a live rubber sleeve occupying the space between the peripheries of said telescoping members and held therebetween under a high degree of mass tension, whereby to effect the driving connection therebetween.

3. A shaft coupling comprising substantially circular telescoping driving and driven members and a distortable sleeve interposed between said telescoping members and effecting driving connection therebetween, the telescoping portions of said substantially circular members extending about the axes of the shafts, said distortable sleeve being held in a substantially distorted condition between said telescoped members whereby to effect the driving connection therebetween by reason of the frictional engagement of said distortable sleeve with the telescoping members.

4. A shaft coupling comprising a driving member, a driven member, a body of distortable material interposed between said driving and driven members and held in position between said members under a mass tension sufficient to effect a frictional driving connection between said driving and driven members.

5. A shaft coupling comprising a driving member, a driven member, a body of distortable material interposed between said driving and driven members under a degree of distortion sufficient to effect a frictional adhesion between said members under all normal driving loads.

6. A shaft coupling comprising spaced telescoping driving and driven members, a live rubber member occupying the space between said driving and driven members and held in a substantially distorted condition therebetween, whereby to effect a driving connection, the rubber member being distorted to a sufficient degree to effect a driving connection between said driving and driven members without the interposition of projections into the mass of the rubber member, said rubber member having a substantially uniform cross section throughout its circumferential extent.

7. An article of manufacture comprising spaced telescoping driving and driven members having opposed substantially circular surfaces and a live rubber member occupying the space between and contacting with the opposed surfaces of said driving and driven members and held in a substantially distorted condition therebetween, whereby to effect a driving connection, the rubber being distorted to a sufficient degree to effect a driving connection between said opposed surfaces of said driving and driven members, said rubber member having a substantially uniform cross section throughout its circumferential extent.

LEON THIRY.